United States Patent [19]
Van Blaricom

[11] Patent Number: 5,324,239
[45] Date of Patent: Jun. 28, 1994

[54] CONTINUOUSLY VARIABLE TRANSMISSION

[76] Inventor: Terry M. Van Blaricom, 6230 Van Nuys Blvd., Van Nuys, Calif. 91401

[21] Appl. No.: 55,549

[22] Filed: May 3, 1993

[51] Int. Cl.⁵ .............................. F16G 1/00
[52] U.S. Cl. ................................... 474/237
[58] Field of Search .......... 474/237, 238, 261, 264, 474/265, 240, 242, 268

[56] References Cited

U.S. PATENT DOCUMENTS

| | | | |
|---|---|---|---|
| 4,618,337 | 10/1986 | Okawa et al. | 474/242 X |
| 4,792,324 | 12/1988 | Whitaker | 474/237 |
| 4,832,671 | 5/1989 | Satoh | 474/242 |

Primary Examiner—Thuy M. Bui

[57] ABSTRACT

A continuously variable transmission in which power is transmitted between pulley sheaves by a series of thin, individually sized steel bands.

2 Claims, 2 Drawing Sheets

CONTINUOUSLY VARIABLE TRANSMISSION

FIELD OF THE INVENTION

This invention relates to transmissions of rotary power, and more particularly to transmissions in which the speed ratio is continuously variable.

BACKGROUND OF THE INVENTION

There have been numerous attempts in the prior art to provide a transmission of the continuously variable type for automotive use. A continuously variable transmission can substantially boost fuel economy because engine speed can easily be pulled back to the most efficient point for the road condition. Additionally, this type of transmission can be much smoother in operation than a typical stepped type automatic transmission. Some transmissions of the prior art have utilized hydraulic means for power transfer and to effect a change in speed ratio. These transmissions have a long service life but deliver poor efficiency due to fluid turbulence losses. Other transmissions use a belt between V-type pulleys with moveable sheaves to transmit power and effect speed ratio changes. Changing the width of the pulleys changes the diameters of the circles on which the belt runs, thus changing the speed ratio between pulleys. These moveable sheave transmissions are more efficient than the hydraulic transmissions, but have a short service life due to wear of the belts and pulleys. Two types of moveable sheave transmissions have had limited success in automotive use. One type uses a rubberized belt to transmit power between pulleys. This type has a low torque capacity because of the limited pressure that can be applied to the belt material by the pulley sheaves. A second type uses a belt of stacked metal wafers for power transmission. The stacked metal wafers provide a push force between pulleys, rather than the pull force that is characteristic of the rubberized belt design. The higher pressure that can be applied to this metal belt by the pulley sheaves increases the torque capacity somewhat over the rubberized belt type. The torque capacity of is limited however, because of the spacing between wafers that is necessary for the belt to be able to bend radially around the arc of the pulleys. This spacing causes the wafers to cock at an angle relative to the radial lines of the pulley sheaves during the transmission of power. This places the wafer edges over a radius on the pulley sheaves, rather than over the straight surface at the radial lines of the sheaves. This severely decreases the area of contact between the edges of the wafers and the surfaces of the pulley sheaves, and so reduces the torque capacity of the transmission per unit size. The cocking movement of the wafers also causes wear between the edges of the wafers and the pulley sheaves, which shortens the service life of the transmission.

While substantial progress has been made in the prior art in providing a continuously variable transmission that is suitable for use in an automobile, there remains a need for a transmission of high efficiency that has an extended service life and a higher torque capacity relative to size.

SUMMARY OF THE INVENTION

A primary object of the present invention is to provide a continuously variable transmission with a high torque capacity relative to size.

Another object of the present invention is to provide a continuously variable transmission that is highly efficient in transmitting power.

Another object of the present invention is to provide a continuously variable transmission with an extended service life.

These and other objectives are achieved in the present invention by providing a continuously variable transmission with moveable V-type pulley sheaves. What is unique is that power is transmitted between pulleys by individually sized bands of spring steel. The bands are sized in length so that they may be placed one inside another, and in width so that the band edges may make uniform contact with the pulley sheaves in the respective circles on which they run. The edges of the bands are ground at an angle that is complimentary to the angle of the pulley sheaves so that a maximum surface area contact can be achieved. The bands are designed in thinness so that only a percentage of the elastic limit of the steel will be reached when radially disposed around the pulleys. In this way, fatigue of the bands material can be predicted and avoided to ensure a long service life. Because the bands are made of spring steel, which is a high modulus material, a high overall pressure can be applied to the band edges by the pulley sheaves. Because a high overall pressure may be applied to the band edges, and because the band edges provide a maximum surface contact on the pulley sheaves with minimal scrubbing, an unprecedented amount of torque can be transmitted between pulleys with a minimum of wear.

The above objects and features of the invention as well as some additional ones are described in detail below with reference to the preferred embodiment which is illustrated in the accompanying drawings.

DESCRIPTION OF THE PREFERRED EMBODIMENT

Figure 1:
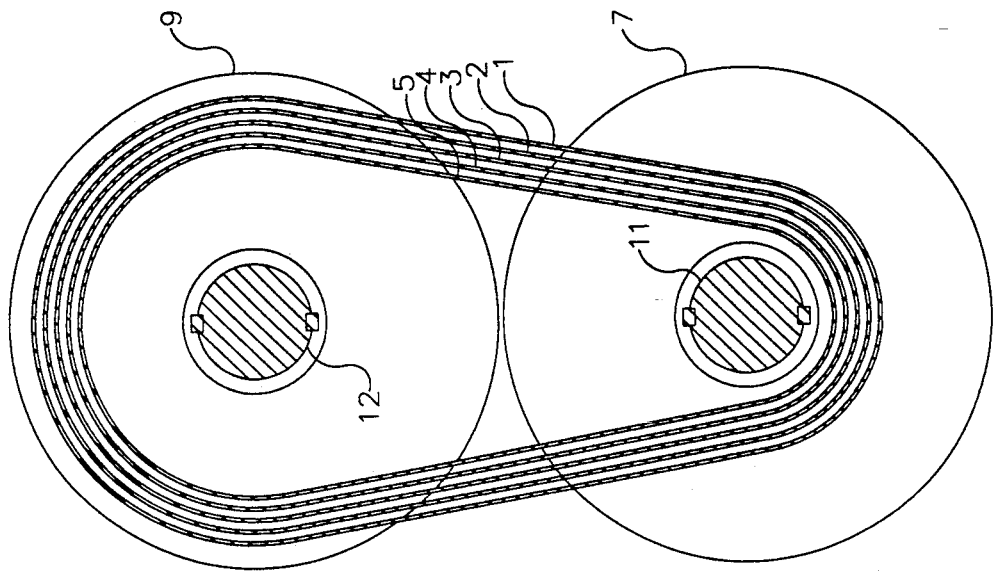
FIG. 1 shows a section through the bands centerline of the present invention which illustrates the positions of the bands when the transmission is at the highest speed ratio.
Figure 2:
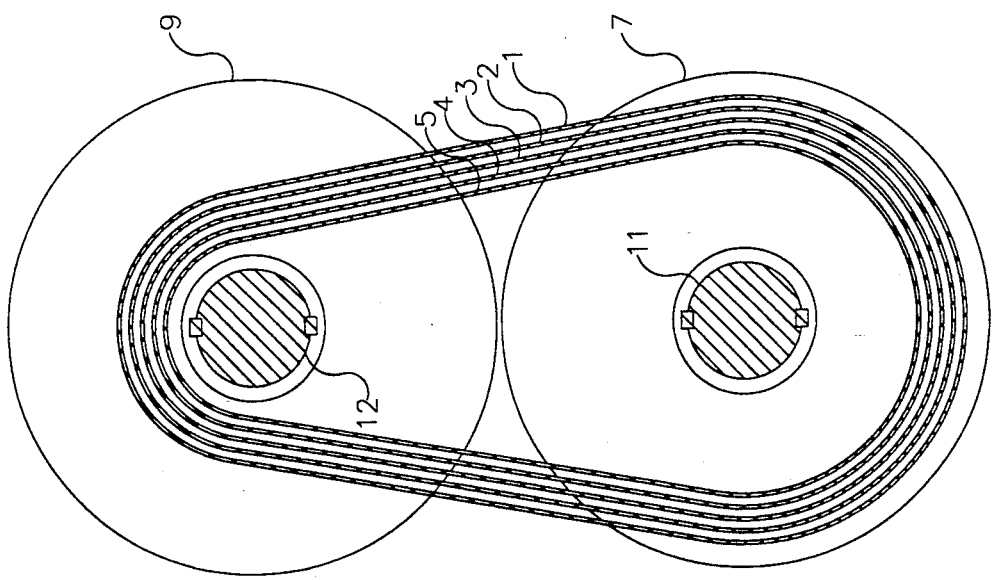
FIG. 2 shows a section through the bands centerline of the present invention which illustrates the positions of the bands when the transmission is at the lowest speed ratio.
Figure 4:
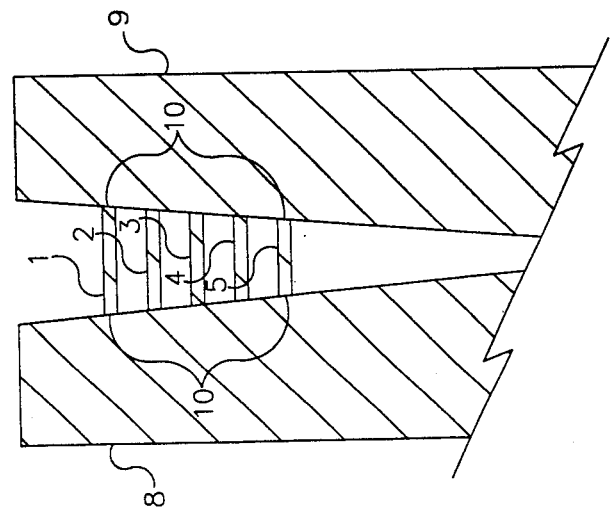
FIG. 4 shows an enlarged detail of the bands on a section of the driven side pulley sheaves as depicted in FIG. 3, which illustrates the spaces between the bands and the chamfers at the sides of the bands that match the angles of the pulley sheave faces.
Figure 3:
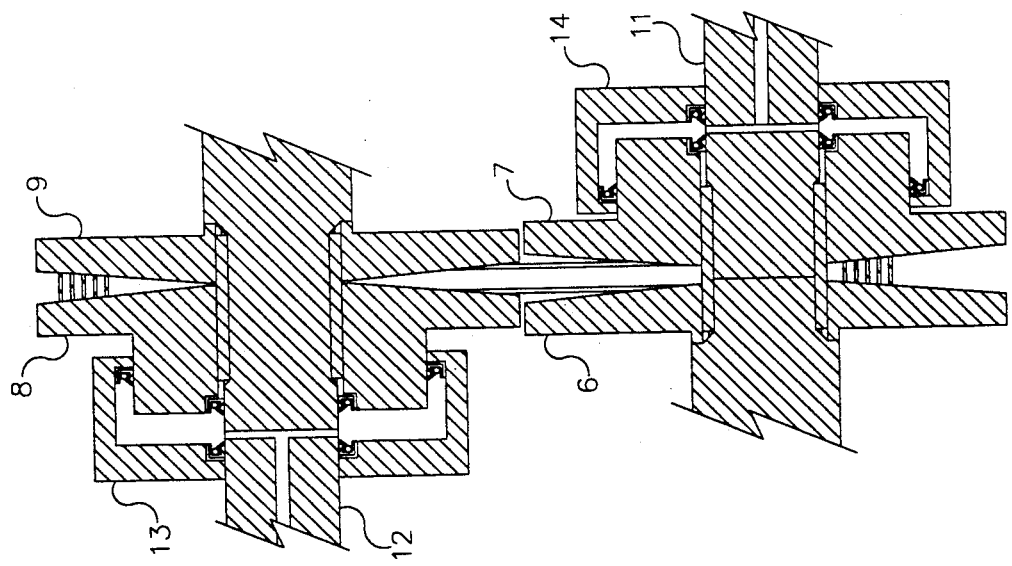
FIG. 3 shows a section through the pulleys centerline which illustrates the positions of the bands at the lowest speed ratio.

Referring to the drawings FIGS. 1–4, the numeral 5 shows a spring steel band that is individually sized in length to fit inside the band shown by numeral 4, and in width so that uniform contact is made between the edges of the band and the surfaces of the soft steel pulley sheaves 6,7,8,9, in the respective circle on which it runs. Similarly, band 4 is sized to fit inside band 3, band 3 is sized to fit inside band 2, and band 2 is sized to fit inside band 1. Bands 1,2,3,4 are, like band 5, sized in width so that uniform contact is made between the bands edges and the surfaces of the pulley sheaves in the respective circles on which they run. For purposes of illustration, a reduced number of bands with a greater thickness and spacing than that of the preferred embodiment are shown. The number of bands may actually be 30 or more, with a thickness of 0.015–0.020" and a spacing between bands of approximately 0.015–0.020". The edges of the bands 10 are ground at an angle that is complimentary to the angle of the pulley sheaves to effect a maximum surface contact between the edges of the bands and the pulley sheaves. The immoveable pulley sheaves 6 and 9 are fixedly attached to the drive shaft 11 and the driven shaft 12 respectively. The moveable pulley sheaves 7 and 8 are fixed radially but are slidable laterally on their respective shafts, with said slidable movements being effected by the drive side hydraulic actuator 14 and the driven side hydraulic actuator 13. The hydraulic actuators push the slidable pulley sheaves toward the fixed pulley sheaves when hydraulic pressure is applied, which in turn applies pressure to the band edges. The application of a pressure differential between the actuators forces the bands to run in a larger diameter circle on the pulley with the higher pressure and in a smaller diameter circle on the pulley with the lower pressure, thus changing the gear ratio. Hydraulic fluid is also pumped throughout the transmission to be used for bearing lubrication and to lubricate and cool the bands and sheaves.

The above described embodiment of the subject invention uses bands of spring steel to transmit power, however it is conceivable that the bands could be of other high strength materials such as Kevlar or a spring grade brass.

It is also conceivable that a material other than soft steel could be used for the pulley sheaves.

It is also conceivable that the pressure applied to the moveable pulley sheaves could be effected by any means known in the art, such as by springs or by centrifugal force.

Again, It is conceivable that the subject invention could be operated without lubrication or cooling.

It is also conceivable that the bands could be individually sized in thickness, as the outer bands do not bend in as tight a radius as the inner bands. An outer band could therefore be made thicker and yet be at the same percentage of the elastic limit as an inner band when radially disposed on the pulleys.

Additional embodiments of this invention will be conceived by others, therefore it is intended that the scope of the invention be limited only by the following claims, and not by the embodiments described above. Reference should be made to the following claims in determining the full scope of the invention.

What is claimed is:

1. A continuously variable transmission comprising:
   a pair of driving sheaves;
   a pair of driven sheaves;
   a series of continuous metal bands radially dispersed about and operationally joining said driving sheaves and said driven sheaves; wherein said continuous metal bands are sized progressively in circumference so that one may fit inside another, and in width so that uniform frictional contact can be made with said driving sheaves and said driven sheaves.

2. A continuously variable transmission as defined in claim 1 wherein said continuous metal bands are chamfered to compliment said driving and said driven sheaves.

* * * * *